United States Patent
Webjorn

(10) Patent No.: US 8,313,264 B2
(45) Date of Patent: Nov. 20, 2012

(54) FLANGED MEMBER AND A FLANGE JOINT COMPRISING FLANGE MEMBERS

(75) Inventor: Jan Webjorn, Karlstad (SE)

(73) Assignee: Verax Engineering AB (SE)

( * ) Notice: Subject to any disclaimer, the term of this patent is extended or adjusted under 35 U.S.C. 154(b) by 0 days.

(21) Appl. No.: 10/500,583

(22) PCT Filed: Dec. 20, 2002

(86) PCT No.: PCT/SE02/02448
§ 371 (c)(1), (2), (4) Date: Jun. 29, 2004

(87) PCT Pub. No.: WO03/062693
PCT Pub. Date: Jul. 31, 2003

(65) Prior Publication Data
US 2005/0129457 A1 Jun. 16, 2005

(30) Foreign Application Priority Data
Dec. 28, 2001 (SE) .................................. 0104467

(51) Int. Cl.
*F16B 1/00* (2006.01)
*F16D 1/033* (2006.01)
*F16D 3/00* (2006.01)

(52) U.S. Cl. ......... 403/183; 403/337; 285/368; 285/412

(58) Field of Classification Search .................. 403/183, 403/335, 337, 336, 338; 285/405, 412, 363, 285/368
See application file for complete search history.

(56) References Cited

U.S. PATENT DOCUMENTS

| | | | | |
|---|---|---|---|---|
| 2,739,828 A | * | 3/1956 | Schindler et al. | 285/148.12 |
| 2,940,779 A | * | 6/1960 | Del Buono | 285/114 |
| 3,135,538 A | * | 6/1964 | George | 285/363 |
| 4,183,562 A | * | 1/1980 | Watkins et al. | 285/405 |
| 5,040,714 A | * | 8/1991 | McManigal | 285/363 |
| 5,050,913 A | * | 9/1991 | Lenz | 285/279 |
| 5,230,540 A | * | 7/1993 | Lewis et al. | 285/363 |
| 5,851,033 A | * | 12/1998 | Hunt et al. | 285/13 |
| 5,938,246 A | * | 8/1999 | Wallace et al. | 285/351 |

FOREIGN PATENT DOCUMENTS
WO  WO93/17268  9/1993

* cited by examiner

Primary Examiner — Daniel P. Stodola
Assistant Examiner — Nahid Amiri
(74) Attorney, Agent, or Firm — Ostrolenk Faber LLP

(57) ABSTRACT

A flanged member (1), intended to be included as a component in a flanged joint, for installation in a pressure equipment device, and having a first flanged end (3) having a first end surface (10) intended to be assembled together with another end surface (4) of a flanged end (11) on another, second flanged member (2) constituting a second component in the flanged joint. The first end surface is slightly concave in the radial direction over at least a part of the extension thereof in the radial direction.

10 Claims, 3 Drawing Sheets

FLANGED MEMBER AND A FLANGE JOINT COMPRISING FLANGE MEMBERS

BACKGROUND OF THE INVENTION

The present invention relates to a flanged member intended to be included as a component in a pressure equipment device, as well as a joint comprising two joint halves in the form of two flanged members and included in a pressure equipment device.

It has been known for a long time to join different parts and components in pressure equipment devices, preferably pipe systems, by using flanged members. By flanged member, also called flange member or only flange, is here intended not just a pipe member, one end of which has been provided with a ring-shaped collar or flange, but also different components which may be included in a pipe system and that have at least one flanged end. It may, for instance, pertain to valves, Y-pieces or joint parts which may have one or more flanged ends for connection to other parts in the pipe system, vessels having a flange for the mounting of a lid, halves of casings for axial flow turbines or the like. The expression "flanged member" in this connection, also be regarded to comprise so-called blind flanges, i.e. an member that is used in order to close a pipe, by the fact that it is mounted on another flanged member in the pipe system or the like. A blind flange is frequently formed as a plate (without opening) that on one hand covers the pipe opening and on the other hand forms the flange, possibly with some type of an axially protruding portion.

So-called flanged joints comprise two flanged members that are closely joined, usually by means of bolts that are screwed through the opposite flange of the two flanged members and with prestress against nuts. Also other types of joining devices may be used, e.g. clips or clamps.

Flanged joints may generally be provided with sealing members or lack sealing members. Sealing members that transfer forces from a flange to another flange are usually denominated gaskets. Sealing members that do not transfer any significant forces from a flange to another and which enable metal-to-metal contact between the flanges are usually denominated seals. The present invention relates in particular to flanged joints without a gasket and which enable metal-to-metal contact, with or without a seal.

Flanged joints and other joints where flanged members are included are used in numerous applications, and the dimensions of the pipes and members that are included may vary substantially. As examples of applications, may be mentioned within the offshore industry, sub sea industry, process industry, petrochemical industry, in power plants, in oil and gas transport pipes, on tankers, etc. The flanged joints and flanged members that are constructed according to conventional technique, with gaskets, and that are used here, are very heavy, space-demanding and expensive. It is given that reliability of the flanged joints as for function and in particular leak tightness has to be guaranteed, since breakdown may cause loss of human life as well as extensive environmental damage and production loss. However, there is in principle always a certain leakage in dismountable flanged joints designed according to conventional technique, and in those cases when fixed welded joints are used instead, a more difficult maintenance and exchange is obtained in return.

Thus, insufficient leak tightness and leakage is among the largest problems as for flanged joints. There may be many reasons for this. A general problem for all types of flanged members and flanged joints is the stresses and loads that arise in the material at the assembly of the flanged ends on the members. In many cases, these also lead to a deformation of the flange, which in turn risks causing deteriorated tightness and problems with leakage. At flanged members where a non-flanged end is welded onto a pipe, which is commonly occurring, frequently these deformations arise as a consequence of the generation of heat during the welding. A known way to try to decrease these problems with stresses in the material is to form the transition between the flange on the flanged end of the member and the non-flanged end as a substantially elliptical area. This known technique is disclosed, for instance, in U.S. Pat. No. 4,183,562 and in WO-A-93/17268.

It is general for all types of flanged joints that in many cases the fact is that the leakage does not arise until after a period of time. This may be due to, e.g., alternating loads and high stresses in combination with thermal loads and vibrations. In many flanged joints, there is also a dynamic condition, which entails that the sealing surfaces become worn and that bolts loose their prestress or cracks as a result of fatigue. Corrosion may also contribute to leakage arising.

A way of trying to cope with these problems of leakage is to form the end surfaces directed towards each other, of two flanged members, so that they are inclined, thereby, in radial cross-section, forming an angle to each other, when they have been brought together but before assembly, so that the distance between the two end surfaces increases in radial direction outwards. Such a solution is also known by said document WO-A-93/17268. However, this leads to an uneven deformation of the end surfaces, which does not provide a good seal. In said document, it is also disclosed how the end surfaces may have part surfaces that are "conical", something which also results in an uneven deformation and poor seal.

It has also turned out that a flanged joint, having end surfaces that abut sealingly against each other after tightening of the bolts or the like of the joint, still starts to leak due to the fact that it is deformed when the system in which it is included is pressurised by the fact that a fluid begins to flow through the system. Said deformation depends foremost on the pressure in the pipe system, the properties of the material in the flange as well as the dimensions thereof.

The deformation that arises in the end surfaces, for various reasons, some of which have been mentioned above, most often means that they do not preserve their flatness, but even become slightly convex, i.e. bulge outwards. In the simplest case, they become slightly convex already in connection with the bolts being tightened and then foremost around the bolt-holes, when it is a bolted joint. This results in the innermost contact point between the end surfaces being displaced somewhat outwards in the radial direction, so that no sealing abutment is obtained between the end surfaces farthest in towards the opening of the flanged member. It is the understanding about this problem that is the basis of the present invention.

Moreover, it is also a fact that it is very difficult on the whole to manufacture flanged members having a satisfying flatness on the end surfaces.

An additional reason for insufficient leak tightness, above all after a period of time, is that sealing members, in particular gaskets, age and lose their function.

In this connection, it should be emphasised that the reliability of flanged joints in respect of leak tightness is of primary importance. Also a deteriorated leak tightness that results in a very small leakage may, for instance, constitute a serious hazard when it is environment-negative, unhealthy or flammable materials that are transported in the pipe system.

SUMMARY OF THE INVENTION

Thus, the object of the present invention is to provide a solution to the mentioned problems.

Thus, by the present invention, is proposed a flanged member that is intended to be included as a component in a flanged joint, for installation in a pressure equipment device and having a first flanged end with a first end surface intended to be assembled together with a second end surface of a flanged end on another, second flanged member constituting a second component in said flanged joint. The first end surface is slightly concave in the radial direction over at least a part of the extension thereof in the radial direction. With the expression "concave" is meant that, at a cross-section through the flanged end, the end surface is limited by a curve being a concave function. The end surface is in other words slightly curved so that it curves or bulges inwards.

By allowing that the end surface becomes slightly concave already at the manufacture, first of all the problem with making it entirely plane is avoided. If you fail ever so little with the flatness, the risk following therewith is also avoided of the end surface instead becoming somewhat convex, which is a large disadvantage as has been explained above. By making the end surface slightly concave, you accordingly put yourself on "the safe side" of the straight line representing the flatness.

At tightening and pressurizing of the joint in which the flanged member is included, the slightly concave or inwardly curving/hollow end surface will be somewhat deformed so that it becomes almost plane. In any case, it will not become convex and it will be possible to retain the highest surface pressure of the end surfaces farthest in at the opening of the flanged member, which is a condition for good leak tightness.

This is particularly important at flanged joints without seal or gasket. In such flanged joints, there are contact surfaces in the form of said end surfaces, which also should work as satisfactory sealing surfaces. Since this is about metal to metal contact, extra high requirements are made on the surfaces so that a satisfactory tightness should be attained. Thus, by means of the present invention, the possibilities are improved of using non-gasketed and seal-free joints and yet achieve a satisfactory tightness. Since gaskets and seals are made from material that age, as has been mentioned above, these types of joints are frequently subjected to leakage after a certain time of use. Therefore, it is a major advantage to instead be able to use non-gasketed and seal-free joints, with a metal-to-metal contact, which give a satisfactory seal. Such joints also have the advantage of having a low weight and less need for space in comparison with conventional technique, in addition to high reliability. Thus, the advantage is obtained of lower initial and operation costs.

As an example of the high leak tightness that is attained with the present invention, it may be mentioned that at tests with joints comprising flanged members according to the invention, leakage that is extremely low has been measured, of the order of 1 g He/500 yrs.

Preferably, the end surface is concave over the entire extension thereof in the radial direction. However, it is feasible to limit the concavity to an area being that which essentially will be subjected to deforming forces when the flanged member is assembled together with another flanged members as well as during use, i.e. pressurizing of the system where the member is included. Particularly at flanged members having very large dimensions, it may be appropriate to only let a part of the radial extension of the end surface be concave. However, in most cases, the concavity begins already farthest in at the opening of the flanged member.

Alternatively, said first end surface is concave in the radial direction over essentially the area that, during use (i.e. pressurizing of the system where the member is included, see above), is foreseen to constitute contact surface against the corresponding end surface of said second flanged member.

According to another alternative, said first end surface comprises more than one concave part surface in the radial direction and said part surfaces may have different radii of curvature.

According to an advantageous feature, the flanged member has an internal, through, axial opening and said first end surface has an innermost abutment point against the corresponding end surface of said second flanged member, which abutment point is situated farthest in the radial direction, at said opening, and that the concavity of the first end surface extends all the way in to said abutment point.

According to an alternative embodiment, suitable for a blind flange, the flanged member is characterized in that said first end surface has an innermost abutment point against the corresponding end surface of said second flanged member, which has an internal, through, axial opening, and that said innermost abutment point is situated farthest in the radial direction, at said opening, and that the concavity of the first end surface extends all the way in to said abutment point.

The concavity is suitably very slight. Thus, the flanged member is characterized in that a conceived straight line X that connects the innermost point a of the first surface, in the radial direction, with the outermost point b thereof, in the radial direction, has a length Lx and that the concavity of the end surface has a maximum depth Dk in relation to a conceived plane surface produced by said line X, which depth Dk is of the order of 0.01%–2% of Lx. Preferably, the depth Dk is of the order of 0.01%–0.2% of Lx. The mentioned interval of Dk is approximate since it also depends on the pressure in the pipe system, the properties of the material in the flange and the dimensions thereof in other respects.

The joint that is proposed according to the present invention comprises two joint halves in the form of two flanged members included in a pressure equipment device, which members have at least one flanged end each having an end surface, and which members are put together via their end surfaces of said flanges, which surfaces are facing each other, characterized in that at least one of said flanged members, and preferably both, is designed according to the present invention.

Thus, by the present invention, the advantage is obtained of a flanged member that in unloaded state is compensated for the deformation it is foreseen to be subject to when it is in a loaded state. Thus, also in the loaded state, you have a flanged joint that has sealing surfaces abutting against each other with metal to metal contact, all the way in to the fluid pressure, i.e. all the way in to the edge closest to the opening. Consequently, the joint is tight.

BRIEF DESCRIPTION OF THE DRAWINGS

The invention will now be described more in detail, reference being made to an embodiment example, illustrated schematically in the accompanying drawings, in which.

DETAILED DESCRIPTION OF THE INVENTION

Figure 1:
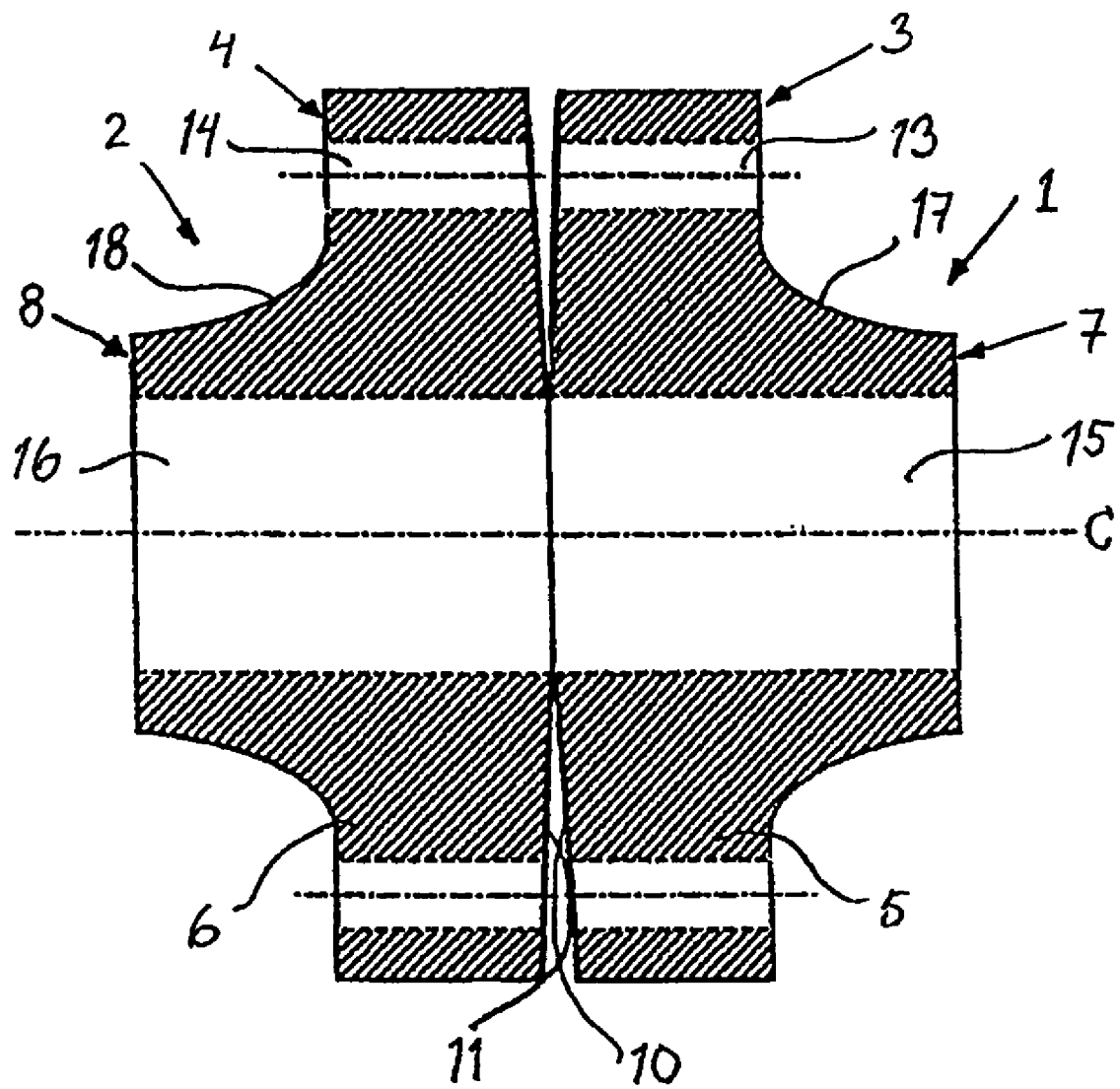
FIG. 1 shows a schematic side view, in cross-section, of a joint according to the present invention.

The joint shown in FIG. 1 comprises two flanged members 1, 2, each having a first end 3, 4 provided with a collar or flange 5, 6, as well as a second non-flanged end 7, 8. The flanged end 3, 4 of the respective flanged members has an end surface 10, 11 that in this case also is a contact surface, i.e. a surface intended to abut against a corresponding surface of the opposite flanged member, after assembly. The flanges 5, 6 extend preferably 360° and are provided with through borings 13, 14. At joining, the flanges are bolted together to a joint by means of bolts that are inserted through said borings. Usually, there are a number of borings arranged evenly distributed around the flange. All through the flanged members, a tubular duct 15, 16 extends. Here, the transition area 17, 18 between the flange and the non-flanged end consists of an elliptically shaped area. The illustrated joint is a non-gasketed and seal-free joint.

The end surfaces 10, 11 of the flanged members facing each other are somewhat chamfered or inclined so that they, in radial cross-section, form an angle to each other, when they have been brought together but before assembly, so that the distance between the two end surfaces increases in the radial direction outwards, which is seen in FIG. 1. After the assembly, which in the illustrated joint is made by a bolt being inserted into each pair of borings 13, 14 and tightened, the end surfaces 10, 11 will abut against each other.

Figure 2:
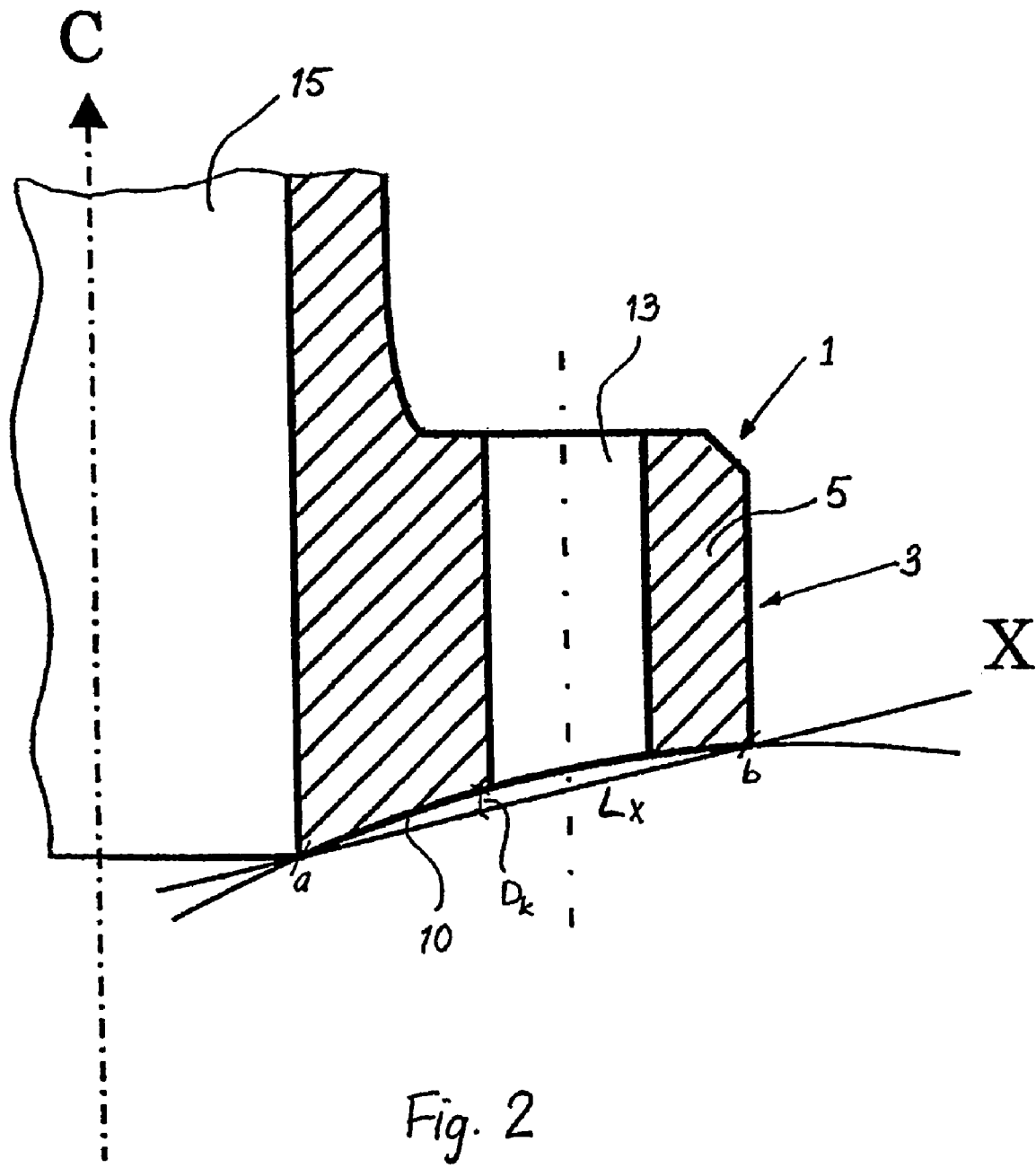
FIG. 2 shows a schematic side view, in cross-section, of a part of a flanged member according to the present invention, and on an enlarged scale

In FIG. 2, a flanged member 1 included in the joint in FIG. 1 is shown schematically and in enlargement. The flanged member 1 has an end surface 10 having a concave shape in the radial direction. The concavity in the schematic illustration is strongly exaggerated, as is the chamfering/inclination of the end surface. The concavity is in effect very small and would, at a depiction according to scale of a flange having the illustrated proportions, not be seen at all. For this reason, here it has been necessary to strongly exaggerate the concavity of the shown end surface and also the inclination. It should also be pointed out that with the expression "the extension of the end surface in the radial direction", is intended throughout this application also the extension that an end surface has that is slightly inclined or sloping and that accordingly is not entirely perpendicular to the centre axis C of the member.

Figure 3:
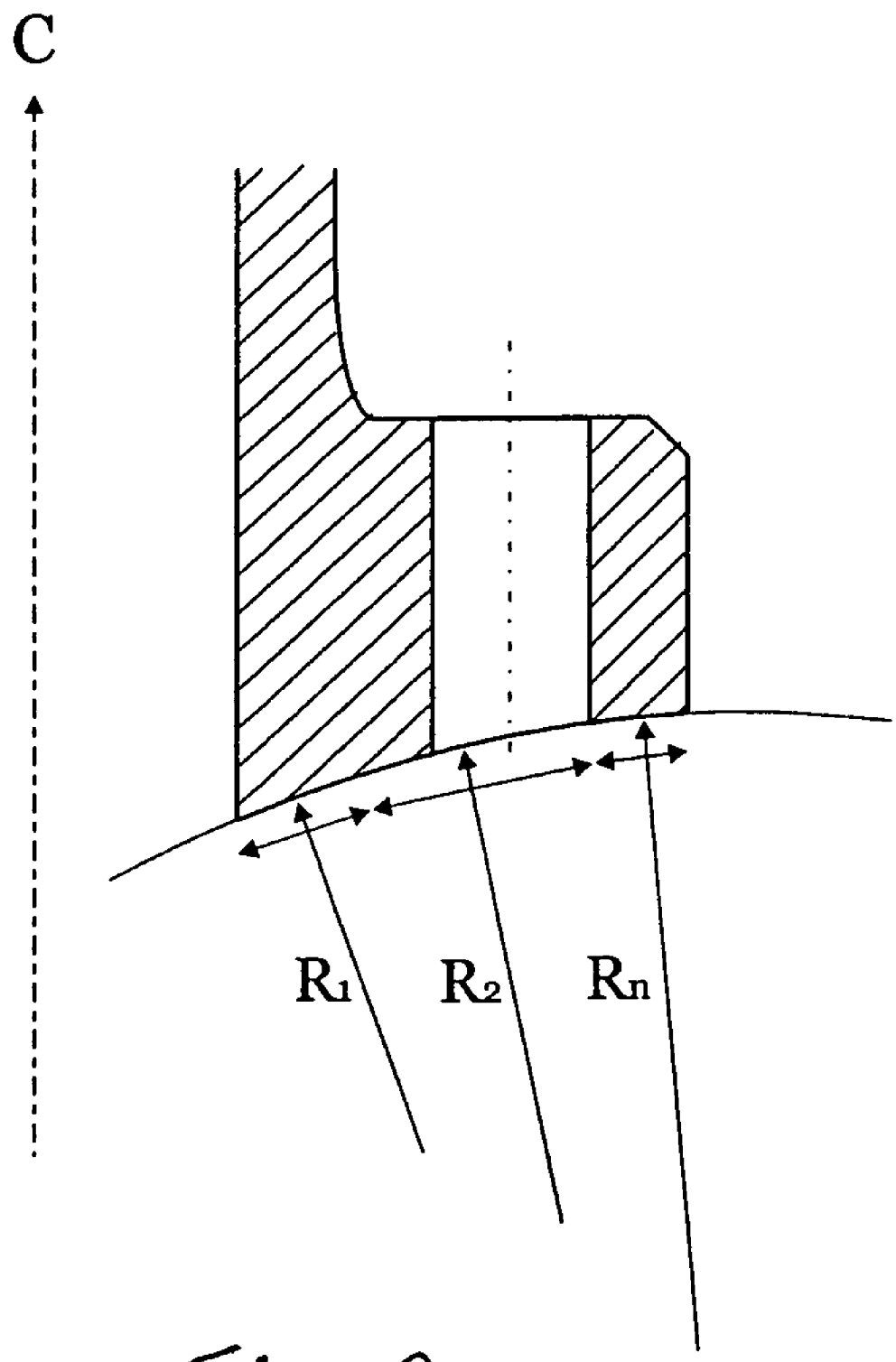
FIG. 3 shows a flanged end with varying concavity or radius of curvature.

The concavity of surface 10 in FIG. 2, i.e., the radius of curvature, is substantially constant. In the alternative, surface 10 may have a varying radius of curvature, as illustrated in FIG. 3. Here, $R_1, R_2 \ldots R_n$ need not be equal.

The end surface 10 has an internal, through, axial opening 15. It has an innermost abutment point a against the corresponding end surface of said second flanged member (not shown), which innermost abutment point is situated farthest in the radial direction, at said opening. It has also a corresponding outermost abutment point b against the corresponding end surface of said second flanged member, which outermost abutment point is situated farthest out in the radial direction. Said abutment points are connected with a conceived straight line X, having a length Lx.

The concavity of the end surface has a maximum depth Dk in relation to a conceived plane surface produced by the same line X, which depth Dk is of the order of 0.01%–2% of Lx, and preferably 0.01%–0.2% of Lx.

Of course, it is preferable that both of the flanged members in a joint have concave end surfaces, but it would also be feasible that only one of the members has a concave end surface.

In the illustrated preferred embodiment example, the concavity extends all over the end surface in the radial direction. However, it would also be feasible that this was not the case, e.g. at flanged members where the flange has very large dimensions. However, the end surface should be concave in the radial direction over at least an area that essentially equals the area that will be subjected to a deforming force when the flanged member in question is assembled together with a second flanged member included in the joint, as well as during use.

The present invention is not limited to the illustrated embodiment example but may be varied and modified in a variety of ways by a person skilled in the art; within the scope of the accompanying claims. Particularly, it should be pointed out that the invention is not limited to the illustrated embodiment example, but may, for instance, have a non-elliptical transition area, a non-inclined end surface, or be provided with seal, e.g. in the form of a seal ring in a groove. The end surface in the illustrated example is a concave surface having only one radius of curvature, but could also be a concave surface composed of a plurality of radii of curvature. It is of course also feasible to apply the invention to inwardly turned flanges, i.e. flanges that are turned inwards in the pipe system.

The invention claimed is:

1. A joint comprising a first flanged member and a second flanged member adapted for a pressure equipment device, said first and second flanged members each comprising:
   at least one flanged end having an end surface comprising a load transferring surface through which forces are transferred when connecting together said first and second flanged members in an assembled state,
   wherein, for the first flanged member, at least a portion of the load transferring surface in an unstressed condition is concave in a radial direction, such that the at least the portion of the load transferring surface is defined by a concave curve function, said load transferring surface is concave in the radial direction over at least an area that is subjected to deformation when the first flanged member is assembled together with said second flanged member, and any first point on the at least the portion of said load transferring surface and any second point of the at least the portion of said load transferring surface distal to the first point meeting a plane inclined in the radial direction of said first flanged member,
   wherein said load transferring surface has an outermost abutment point in a cross section of the first flanged member, the outermost abutment point configured to abut against the end surface of the second flanged member when assembled together with said corresponding second flange member, the outermost abutment point being the abutment point situated farthest in the radial direction from the central axis of the first flanged member,
   said load transferring surface has an innermost abutment point in a cross section of the first flanged member, the innermost abutment point configured to abut against the end surface of the second flanged member when assembled together with said corresponding second flange member, the innermost abutment point being the abutment point situated nearest in the radial direction from the central axis of the first flanged member; and
   a boring passing through the end surface of the first flanged member at a radial distance from a central axis of the first flanged member greater than the radial distance from the central axis of the first flanged member to the innermost abutment point, and less than the radial distance from the central axis of the first flanged member to the outermost abutment point,
   wherein the load transferring surface of the first flanged member faces the load transferring surface of the second flanged member before assembly and is inclined in the radial direction outwards to form an angle in radial cross-section, the angle being such that a distance between the two load transferring surfaces increases in the radial direction outwards, said inclined load transferring surfaces being concave.

2. The joint according to claim 1, wherein said first load transferring surface is concave over the entire extension thereof in the radial direction.

3. The joint according to claim 1, wherein said first load transferring surface comprises a concave surface including an inner surface portion and an outer portion positioned distal in the radial direction with respect to the inner surface portion, the inner surface portion having a radius of curvature different from the radius of curvature of the outer surface portion.

4. The joint according to claim 1, said first flanged member further comprising an internal axial through opening, said first flanged member load transferring surface having said innermost abutment point configured to abut against the end surface of said second flanged member, said innermost abutment point being situated nearest in the radial direction, to said opening, the concavity of the first flanged member load transferring surface extending all the way in to said innermost abutment point.

5. The joint according to claim 1, wherein said first flanged member load transferring surface has said innermost abutment point configured to abut against the end surface of said second flanged member at an internal axial through opening of said second flanged member, said innermost abutment point being situated nearest in the radial direction, to said opening, the concavity of the first flanged member load transferring surface extending all the way in to said innermost abutment point.

6. The joint according to claim 1, wherein a conceived straight line that connects a proximal point of said load transferring surface of the first flanged member, in the radial direction, with a distal point thereof, in the radial direction, has a length Lx and the concavity of said first load transferring surface has a maximum depth Dk in relation to a conceived plane surface produced by said line, which depth Dk is of the order of 0.01%-2% of Lx.

7. The joint according to claim 1, wherein the first flanged member further comprises:
    a non-flanged end oriented transverse to a longitudinal axis of the first flanged member; and
    a transition area positioned between the at least one flanged end and the non-flanged end,
    wherein at least a part of a transition area is shaped as an elliptical area.

8. The joint according to claim 7, wherein the first and second flanged members each have a concave load transferring surface.

9. The joint according to claim 1, wherein the at least the portion of the first load transferring surface in the unstressed condition that is concave comprises a majority of the first load transferring surface.

10. The joint according to claim 1, wherein the second flanged member is identical with the first flanged member.

* * * * *